M. GERSTER & E. L. HUG.
MACHINE FOR TREATING COFFEE BEANS.
APPLICATION FILED JAN. 25, 1911.
1,007,093.
Patented Oct. 31, 1911.
3 SHEETS—SHEET 3.
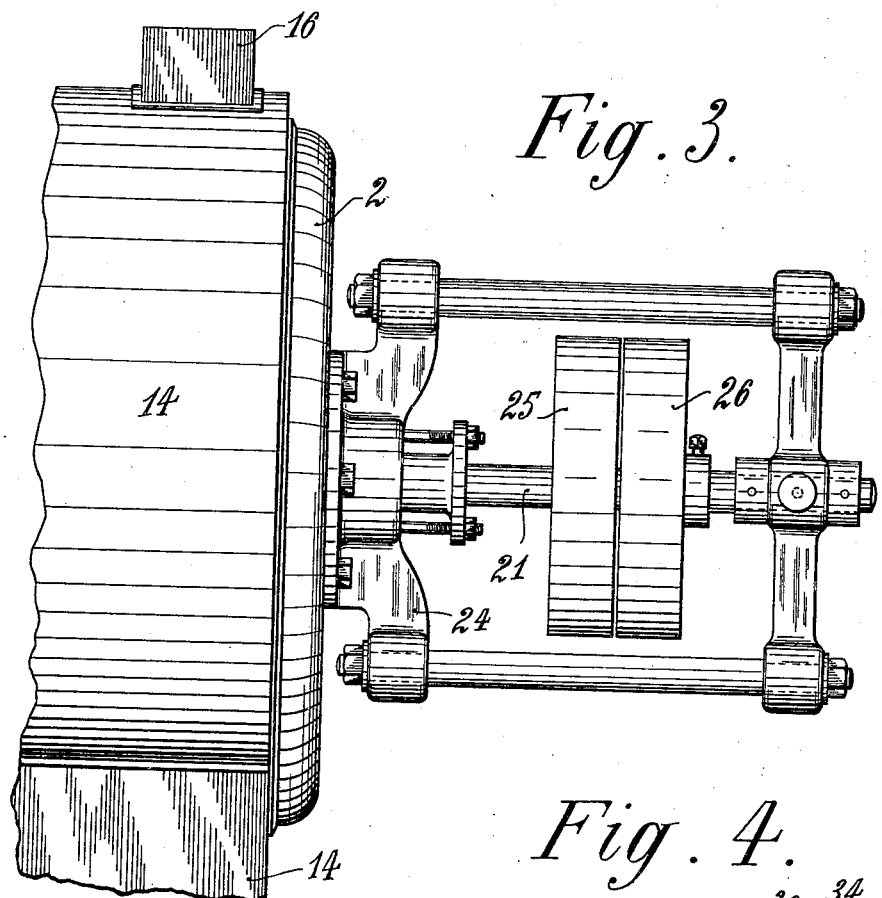
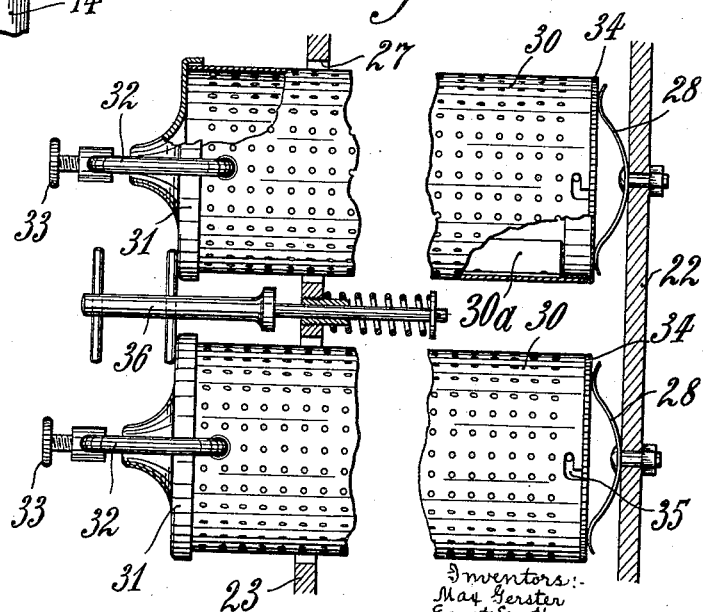
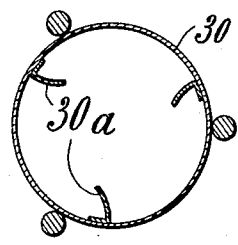

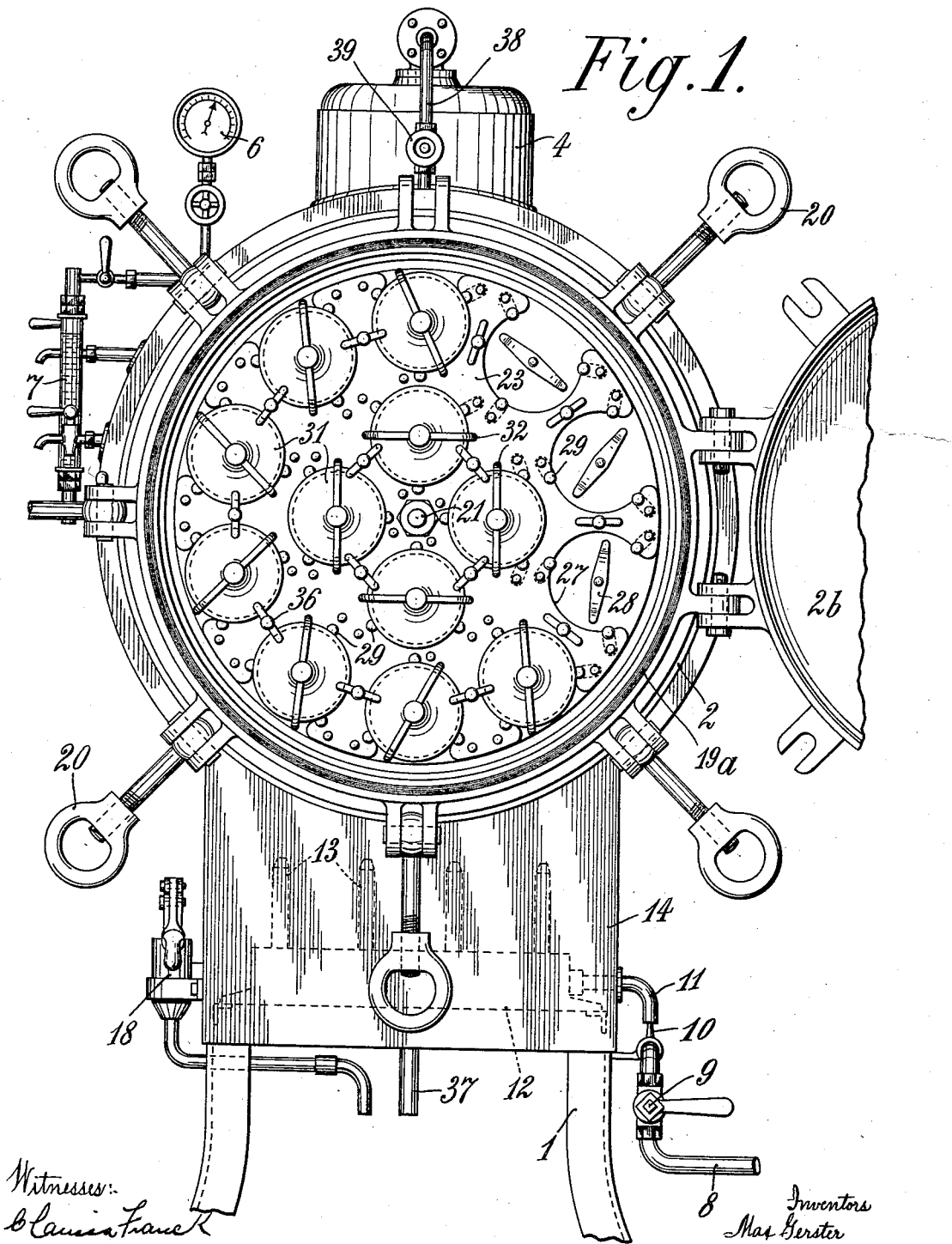

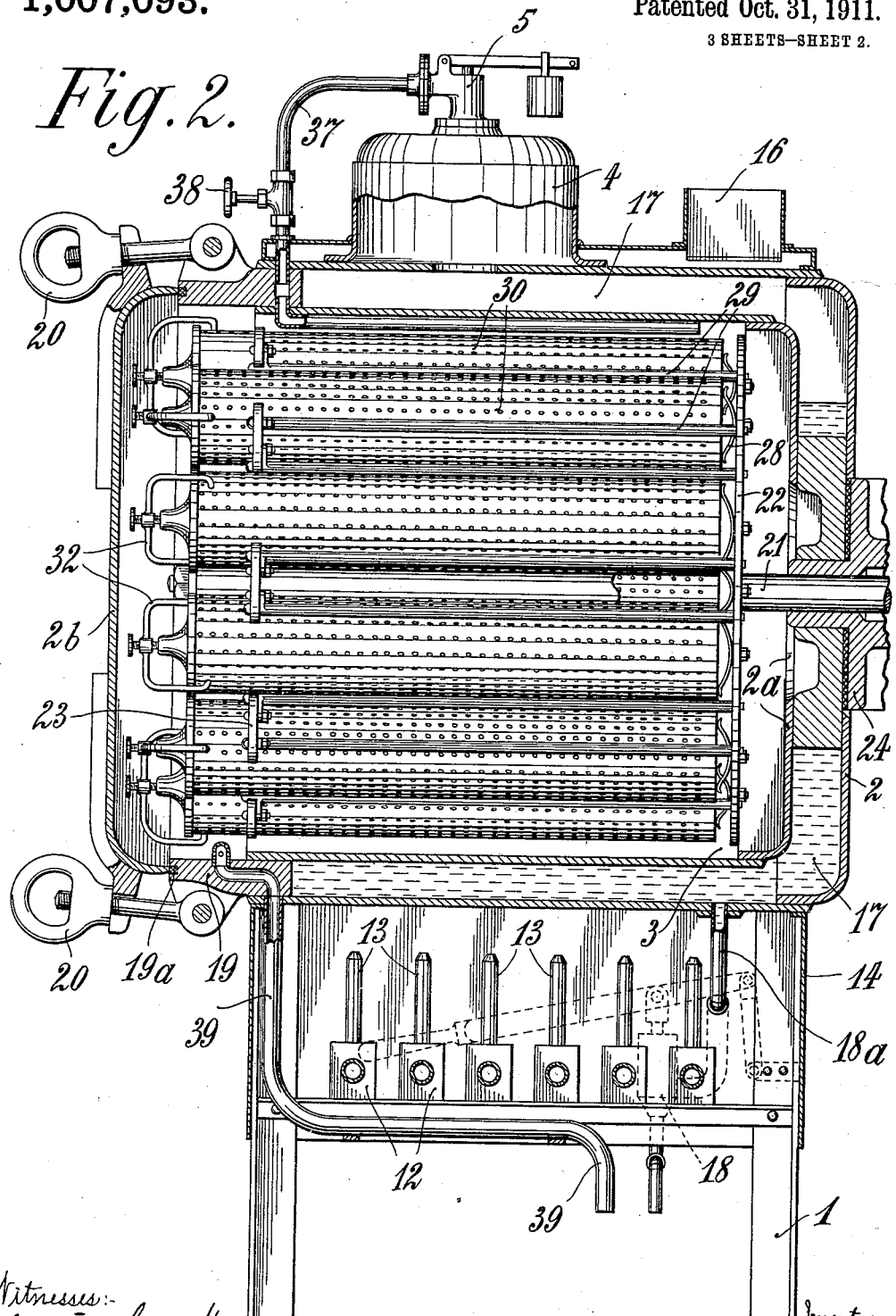

UNITED STATES PATENT OFFICE.

MAX GERSTER, OF MONTREUX, AND ERNST LEO HUG, OF BERNE, SWITZERLAND, ASSIGNORS TO THE FIRM OF SPRAGUE, WARNER & COMPANY, OF CHICAGO, ILLINOIS.

MACHINE FOR TREATING COFFEE-BEANS.

1,007,093.  Specification of Letters Patent.  Patented Oct. 31, 1911.

Application filed January 25, 1911. Serial No. 604,529.

*To all whom it may concern:*

Be it known that we, MAX GERSTER and ERNST LEO HUG, citizens of the Swiss Confederation, and residing, respectively, at Montreux and Berne, Switzerland, have invented a certain new and useful Improved Machine for Treating Coffee-Beans, of which the following is a specification.

Our invention relates to the preliminary preparation of coffee beans for the purpose of making non-poisonous coffee, and a primary object is to provide therefor an improved machine comprising a number of cylindrical vessels or cans for the coffee beans movably mounted in a steam-chamber, wherein each bean is brought into intimate contact with steam flowing through the chamber.

Another object is to provide that the heat of the products of combustion from the gas-heater for heating the boiler supplying steam to the machine is used not only for heating the boiler but also for heating the beans in the steam-chamber.

One illustrative embodiment of our invention is represented by way of example in the accompanying drawings, wherein:—

Figure 1 is an end elevation of our machine, the door of the boiler being shown open and part broken away; Fig. 2 is a side elevation, partly in section, the door being shown closed; Fig. 3 is a detail view; and Figs. 4 and 5 show details, on an enlarged scale, in side elevation and transverse section respectively.

Referring to the drawings, the frame 1 carries the horizontal boiler which comprises the annular outer shell 2 closed at one end and the similarly shaped inner shell $2^a$ and contains the steam-chamber 3 which can be closed by a hinged door $2^b$. The boiler is provided with a dome 4, having a safety valve 5, and also with a manometer 6 and a water gage 7, and is heated from below by a gas-heater comprising six parallel pipes 12 each carrying burners 13 and connected to a common gas pipe 11, into which the nozzle 10 of the gas-supply pipe 8 provided with the gas-cock 9 enters. The gas-heater is surrounded by a casing or jacket 14 which also surrounds the outer shell of the boiler at a suitable distance therefrom, so that the products of combustion from the heater can flow around the boiler, and is provided with a chimney 16 for leading off the products of combustion.

In order to be able to keep the level of the water 17 in the boiler always at approximately the same height we provide a manual feed-pump 18 connected with the boiler by the pipe $18^a$.

For the purpose of closing the door of the steam-chamber steam-tight, we provide the annular boiler-end 19 with an india-rubber packing ring $19^a$ (Fig. 1) and with swing-bolts 20 by which the door can be firmly pressed against the end of the boiler.

A shaft 21 carrying in the steam-chamber 3 a rack comprising two disks 22 and 23 connected together by a number of rods 29 is journaled only in a bearing 24 (Figs. 1 and 3), which is partially located outside the boiler, and carries outside the boiler a loose pulley 25 and a fast pulley 26. The disk 23 has a number of circular holes or recesses 27 and the disk 22 carries opposite these holes or recesses an equal number of flat springs 28. The rods 29 connecting the two disks 22 and 23 are arranged in such manner that at the edge of each of the recesses or holes 27 there are three of these rods, so that cylindrical vessels or cans 30 pushed into the rack through the holes or recesses 27 are guided by the same. The cans 30 have perforated walls, as clearly shown in Fig. 4, are each provided within with three longitudinal ribs $30^a$, as shown in Fig. 5, and are each normally closed at one end by a removable lid 31. In order to be able to press the lids 31 firmly against the walls of the cans, we provide on the walls of the cans revoluble bows or stirrups 32 provided with screws 33, by means of which the lids can be pressed firmly against the ends of the cans. The bottom 34 at the other end of each can is detachably attached by means of a bayonet joint 35 to the wall of the can. The cans are held in the rack by means of spring-pressed bolts 36 mounted on the disk 23 so that they are held elastically at both ends.

An inlet pipe 37, in which a stop valve 38 is provided, leads from the dome 4 into the steam-chamber 3 and a pipe 39, preferably leading to a condenser, is connected to the bottom of said chamber.

Our machine is operated as follows:—The cans 30 have coffee beans put into them outside the machine, are closed with the lids 31, pushed into the rack and held therein by means of the bolts 36, whereupon the door is tightly closed. The water in the boiler is then heated by means of the gas-heater and is partially evaporated. Owing to the provision of the nozzle 10 air is carried into the pipe 11 and a higher temperature of the flame is obtained in known manner than is the case without the supply of air. The steam generated in the boiler goes into the dome 4 and is conducted thence through the pipe 37 into the steam-chamber 3 where it flows through the perforations in the walls of the cans 30 and causes the coffee beans in the latter to burst. While steam is flowing into the steam-chamber 3 the rack carrying the cans 30 is rotated by driving the shaft 21. While the cans 30 are being rotated the coffee beans in the same fall against the ribs and are thoroughly shaken up, and consequently the steam entering into the steam-chamber 3 is caused to contact intimately with the coffee-beans before leaving the machine through the pipe 39. Before passing out through the chimney 16, the products of combustion from the gas-heater flow partly around the boiler in the annular chamber formed by the boiler and the jacket 14, whereby the heating effect on the coffee beans in the cans 30 is increased. Owing to the action of the heat of the products of combustion and of the steam on the coffee beans the latter are caused to burst and the poison contained in the same is removed. After the steam has acted on the beans for a sufficiently long time the shaft 21 is stopped, the cans are removed from the machine and emptied, whereupon they can be thoroughly cleaned owing to their bottoms 34 being attached by means of bayonet joints.

We claim:—

1. In a machine for treating coffee beans, the combination, with a steam-chamber having a steam inlet, a steam outlet and an opening in the wall thereof, of a door normally tightly closing the opening, a plurality of cylindrical vessels within, and in open relation with, the steam-chamber, a support upon which said vessels are arranged radially, means for rotating said support, and a steam boiler connected with the steam inlet.

2. In a machine for treating coffee beans, the combination, with a steam-chamber having a steam inlet, a steam outlet and an opening in the wall thereof, of a door normally tightly closing the opening, a rack revolubly mounted in the steam-chamber, a plurality of cylindrical perforated vessels carried by the rack, and a steam boiler connected with the steam inlet.

3. In a machine for treating coffee beans, the combination, with a steam-chamber having a steam inlet, a steam outlet and an opening in the wall thereof, of a door normally tightly closing the opening, a rack revolubly mounted in the steam-chamber, a plurality of cylindrical perforated vessels each having internal ribs carried by the rack, and a steam boiler connected with the steam inlet.

4. In a machine for treating coffee beans, the combination of a steam boiler surrounding and closing one end of a steam-chamber having a steam inlet connected with the boiler and a steam outlet, a door pivotally attached to the boiler and normally tightly closing the other end of the steam-chamber, a rack revolubly mounted in the steam-chamber, and a plurality of perforated cans held in the rack.

5. In a machine for treating coffee beans, the combination of a steam boiler surrounding and closing one end of a steam-chamber having a steam inlet connected with the boiler and a steam outlet, a door pivotally attached to the boiler, and normally tightly closing the other end of the steam-chamber, a gas-heater under the boiler, a casing, provided with an outlet, surrounding the gas-heater and jacketing the boiler, a rack revolubly mounted in the steam-chamber, and a plurality of perforated cans held in the rack.

6. In a machine for treating coffee beans, the combination of a steam boiler surrounding and closing one end of a steam-chamber having a steam inlet connected with the boiler and a steam outlet, a door pivotally attached to the boiler and normally tightly closing the other end of the steam-chamber, a manual feed pump connected to the boiler, a rack revolubly mounted in the steam-chamber, and a plurality of perforated cans held in the rack.

7. In a machine for treating coffee beans, the combination of a steam boiler surrounding and closing one end of a steam-chamber having a steam inlet connected with the boiler and a steam outlet, a door pivotally attached to the boiler and normally tightly closing the other end of the steam-chamber, a rack revolubly mounted in the steam-chamber, and a plurality of perforated cans elastically held in the rack.

In testimony whereof, we affix our signatures in the presence of two witnesses.

MAX GERSTER.
ERNST LEO HUG.

Witnesses:
 FRIEDRICH NAEGALI,
 FRIEDRICH MANING.

Copies of this patent may be obtained for five cents each, by addressing the "Commissioner of Patents, Washington, D. C."